United States Patent [19]

Hinkle

[11] Patent Number: 5,684,245

[45] Date of Patent: Nov. 4, 1997

[54] APPARATUS FOR MASS FLOW MEASUREMENT OF A GAS

[75] Inventor: Luke D. Hinkle, Townsend, Mass.

[73] Assignee: MKS Instruments, Inc., Andover, Mass.

[21] Appl. No.: 560,037

[22] Filed: Nov. 17, 1995

[51] Int. Cl.[6] .............................. G01F 25/00; G01F 1/50; G01F 1/86
[52] U.S. Cl. ................. 73/3; 73/861.02; 73/865
[58] Field of Search .................... 73/3, 865, 861.02, 73/861.03, 199, 861, 1.34

[56] References Cited

U.S. PATENT DOCUMENTS

| | | | |
|---|---|---|---|
| 3,668,554 | 6/1972 | Kipnis et al. | 73/4 R |
| 3,729,995 | 5/1973 | Kovacs et al. | 73/861.03 |
| 4,501,156 | 2/1985 | Kretschmer et al. | 73/861.04 |
| 4,663,977 | 5/1987 | Vander Hayden | 73/861.03 X |
| 4,785,669 | 11/1988 | Benson et al. | 73/718 |
| 4,987,773 | 1/1991 | Stiles et al. | 73/118.2 |
| 4,995,258 | 2/1991 | Frank | 73/118.2 |
| 5,155,653 | 10/1992 | Kremidas | 361/283 |
| 5,207,767 | 5/1993 | Delatorre | 73/733 |
| 5,369,976 | 12/1994 | Ratton | 73/116 X |
| 5,388,453 | 2/1995 | Ratton et al. | 73/117.1 |
| 5,388,462 | 2/1995 | Delatorre | 73/718 |
| 5,396,803 | 3/1995 | Ferran | 73/724 |
| 5,410,908 | 5/1995 | Erichsen | 73/31.05 |
| 5,445,035 | 8/1995 | Delajoud | 73/861.01 X |

OTHER PUBLICATIONS

Hyland et al. *J. Vac. Sci. Technol.* A 9 (6) pp. 2843–2864 Nov./Dec. 1991 "Reccomended Practices for the Calibration and Use of Capacitance Diaphragm Gages as Transfer Standards".

Jousten et al. (1993) *Vacuum*/vol. 44/Nos. 5–7/ pp. 569–572 "The Uncertainties of Calibration Pressures at PTB".

Calcatelli et al. (1993) *Vacuum*/vol. 44/Nos. 5–7/ pp. 573–576 "Primary and Secondary Vacuum Measurements".

MKS Instruments Inc., *ROR Gas Flow Rate Calibrator*, Bulletin ROR–Nov. 1993, 5 pages.

H. C Straub et al. Oct. 1994 *Rev. Sci. Instrum.* vol. 65, No. 10, pp. 3279–3281 "Use of Capacitance Diaphragm Gauges at Pressures Down to $10^{-6}$ Torr".

Charles R. Tilford 1992 NCSL Workshop & Symposium pp. 583–592 "New Directions in Vacuum Measurement at NIST".

*Primary Examiner*—Thomas P. Noland
*Attorney, Agent, or Firm*—Lappin & Kusmer LLP

[57] ABSTRACT

Apparatus for and method of measuring mass flow of a gas in a gas delivery system. The apparatus is adapted to be connected to a source of a gas. The apparatus includes a fixed-volume chamber in fluid connection with the gas source. A flow control device can be used to control the flow of the gas into the chamber. A transducer assembly comprises, in combination, a pressure transducer in fluid connection with the chamber, and a signal modifying network associated with the pressure transducer. The pressure transducer permits measurement of the pressure of the gas in the chamber and provides a first electrical signal representative of the pressure of the known volume of the gas. The signal modifying network modifies the first signal to produce an output signal which is proportional to PV/RT and thus directly represents the number of moles of the gas in the chamber. The apparatus is useful for calibrating mass flow controllers and the like.

48 Claims, 3 Drawing Sheets

APPARATUS FOR MASS FLOW MEASUREMENT OF A GAS

FIELD OF THE INVENTION

The present invention relates to an apparatus for and method of measuring mass flow and for calibrating mass flow control equipment, and more particularly to an apparatus for and a method of obtaining direct, accurate measurement of the mass flow of a gas in a gas delivery system.

BACKGROUND OF THE INVENTION

It is desirable and often times necessary when delivering a gas in measured amounts to be able to obtain accurate measurements of gas flow conditions in gas delivery systems used to deliver such a gas, as for example, when testing the accuracy of or calibrating a mass flow controller. One way to accomplish this is by measuring the rate of change in temperature and pressure of a gas in a chamber of known volume and calculating mass flow from the measured values. According to this so-called "rate of pressure rise", or "rate of rise" (ROR) method, a gas flow is conducted through a device under test (DUT), such as a mass flow meter, into an evacuated, volume-calibrated chamber for a measured interval of time, $\Delta t$. The changes in pressure ($\Delta P$) and temperature ($\Delta T$) of the gas in the chamber are measured and corrected to a standard temperature ($T_0$) and pressure ($P_0$). The term "standard", as used herein, means "standard conditions", usually defined as an "absolute" temperature of 273.15K and an "absolute" pressure of 1 atmosphere. The gas flow rate can then be calculated from the change in pressure over time ($\Delta P/\Delta t$) and the change in temperature over time ($\Delta T/\Delta t$) in the known volume.

Rate-of-rise gas flow measurement apparatus therefore typically includes separate sensing elements for measuring the changes in pressure and temperature of the gas in the chamber during the measured interval of time. Such apparatus can provide highly accurate measurements of the primary variables (volume, pressure, temperature and time). In fact, such measurements can be used as primary reference standards for calibration of gas flow. However, the use of multiple measurement devices in the gas flow line takes up excessive space and may be difficult to implement, or simply impractical for use in systems having extremely tight space constraints. Further, the need to obtain separate measurements for pressure and temperature also necessitates the use of additional hardware, such as cables, connectors and analog/digital converters, thereby further increasing the complexity, size and expense of a traditional ROR gas flow measurement system. Moreover, additional software programming is required to perform the necessary computations from the independent pressure and temperature measurements.

Many gas delivery systems employ gases which behave substantially as ideal gases. In other words, their behavior can be accurately predicted by and modeled in accordance with the ideal gas law, expressed as $PV=nRT$, where P is pressure, V is volume, n is the number of moles of the gas, R is the universal gas constant, and T is absolute temperature. The relationship between pressure change and temperature change of a substantially ideal gas in a fixed volume over time is constant regardless of the gas. Thus, the ideal gas law relationship can be used to determine n, the mass, i.e., the number of moles of gas in the chamber. In those situations in which gases behave somewhat differently from an ideal gas, simple correction factors can be used to render the measurement of pressure and temperature changes over time more accurate.

It would be advantageous to provide a measurement apparatus which can be used in a fluid flow line to determine the amount of gas flowing into or out of a DUT, and which can be used for calibrating mass flow control equipment.

OBJECTS OF THE INVENTION

It is therefore a general object of the present invention to reduce or substantially overcome the above-noted disadvantages of the prior art.

A more specific object of the present invention is to provide a less expensive, less complex and more compact apparatus for and method of directly and accurately measuring and calibrating a flow of a gas in a fluid delivery system than that provided by the prior art apparatus using multiple measurement devices in the gas flow line.

Another object of the present invention is to provide an apparatus and method which avoid the need to obtain separate measurements for pressure and temperature, reducing the need for hardware and software associated with such separate measurements.

And another object of the invention is to provide an apparatus for and method of providing a single output signal which accounts for the temperature, pressure and volume of a gas flowing in a fluid delivery system.

Still another object of the invention is to provide an apparatus for and method of providing a single output signal which directly represents average gas flow.

Yet another object of the invention is to provide an apparatus and method of obtaining direct, in situ measurement of gas flow which can be retrofitted into an existing fluid delivery system.

SUMMARY OF THE INVENTION

The present invention provides a relatively simple apparatus for and method of determining and calibrating average mass flow of a gas in a fluid delivery system in which a gas is the measured flow medium. The apparatus and method provide a single output signal which is proportional to, and thus directly representative of, the number of moles of gas in the chamber, without mathematical computations and without the need for taking separate measurements of pressure and temperature.

In accordance with one aspect of the present invention, the above and other objects of the invention are achieved by an apparatus for and method of measuring the mass flow of a gas using a single transducer assembly. The apparatus comprises a source of a gas, and a chamber in fluid connection with the gas source. The chamber has a gas inlet port, a gas outlet port and a valve assembly for selectively opening and closing the ports to a flow of the gas. The chamber also has a known, constant volume. The apparatus can be used to calibrate a flow controlling assembly for conducting a controlled flow of the gas from the gas source into the chamber.

The transducer assembly comprises, in combination, a pressure transducer in fluid communication with the chamber, and a signal modifying device associated with the pressure transducer. The pressure transducer measures the pressure of the gas in the chamber and provides a first signal as a function of the pressure of the gas in the volume-calibrated chamber. The signal modifying device modifies the first signal to produce an output signal as a function of the number of moles of the gas in the chamber.

In one embodiment of the invention, the signal modifying device comprises a voltage dividing network which includes a temperature-sensitive resistance element. The network has an input terminal, a ground, and at least one temperature-sensitive resistance element electrically connected in series with at least one temperature-insensitive resistance element. The resistance elements are themselves electrically connected between the input terminal and ground. An output terminal is located between the temperature-sensitive resistance element and the temperature-insensitive resistance element. With such an arrangement, the magnitude of the output signal from the network is proportional to the ratio of the pressure of the gas in the volume-calibrated chamber to the temperature of the gas in the chamber.

In accordance with one aspect of the invention, the temperature-sensitive resistance element is electrically connected between the input terminal and the output terminal, and the temperature-insensitive resistance element is electrically connected between the output terminal and ground.

In accordance with another aspect of the invention, the temperature-insensitive resistance element is electrically connected between the input terminal and the output terminal, and the temperature-sensitive resistance element is electrically connected between the output terminal and ground.

The temperature-sensitive resistance element of the voltage dividing network is in thermal connection with the gas in the chamber.

According to yet another aspect of the invention, the voltage dividing network further includes an optional buffering element for buffering the output signal.

According to still another aspect of the invention, the temperature-insensitive resistance element of the voltage dividing network has a resistance value $R_F$ which is defined by the relationship $R_F = -R_{TC_{ref}}(1-\alpha T_{ref})$, where the temperature-sensitive resistance element has a resistance value $R_{TC}$ defined by the relationship $R_{TC} = R_{TC_{ref}}(1+\alpha(T-T_{ref}))$. In these equations, $R_{TC_{ref}}$ is the value of the resistance of the temperature-sensitive resistance element at an absolute reference temperature $T_{ref}$ (in Kelvin), $\alpha$ is the temperature coefficient of resistance of the temperature-sensitive resistance element (in parts per million per Kelvin, or ppm/K), and T is the absolute temperature of the gas in the chamber.

In one embodiment of the invention, the pressure transducer is a capacitance manometer.

These and other objects and advantages of the invention will in part be obvious and will in part appear hereinafter. The invention accordingly comprises the apparatus possessing the construction, combination of elements and arrangement of parts which are exemplified in the following detailed disclosure, the scope of which will be indicated in the claims.

BRIEF DESCRIPTION OF THE DRAWINGS

For a fuller understanding of the nature and objects of the present invention, reference should be had to the following detailed description taken in connection with the accompanying drawings, in which.

DETAILED DESCRIPTION OF THE DRAWINGS

The present invention is a relatively simple, economical and space-efficient apparatus for the measurement of the mass flow of a gas. As is well known in the art, if the flow of an ideal gas is conducted into a chamber of known volume and its temperature and pressure measured, the mass measured by the number of moles n of the gas can be determined directly using the equation of state for an ideal gas law, expressed as:

$$n = PV/RT, \qquad (1)$$

wherein n is the mass of the gas in the chamber (number of moles), P is the pressure of the gas in the chamber (Torr), V is the volume of the chamber (liter), R is the universal gas constant, and T is the temperature of the gas in the chamber (K).

The apparatus of the present invention provides a convenient means for directly determining the magnitude of this ratio and for providing an electrical signal which directly represents a standard volume of a given ideal gas per unit of signal energy (e.g., moles of gas per volt).

Figure 1:
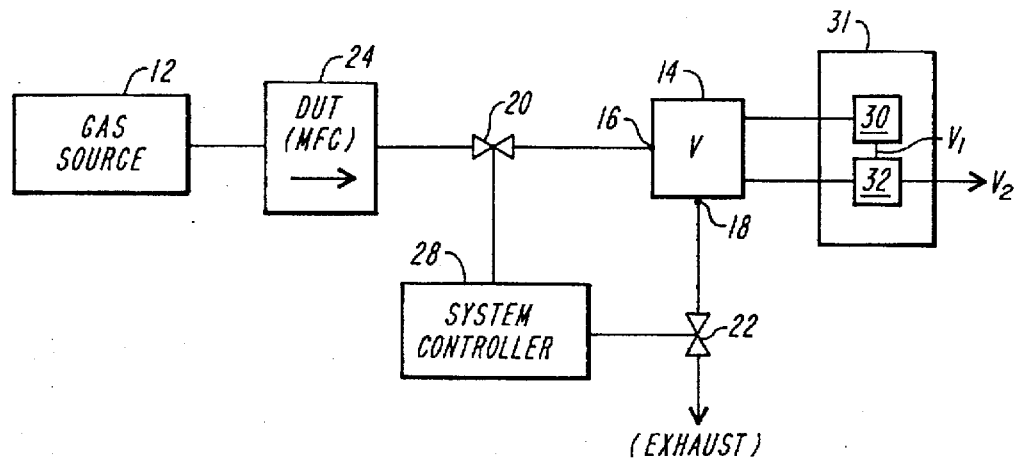
FIG. 1 is a simplified block diagram of the apparatus of the present invention.

The apparatus of the invention is illustrated schematically in FIG. 1. A source 12 of a gas is provided in a fluid delivery system. The gas source 12 is in fluid connection with a DUT 24, illustrated in FIG. 1 as a mass flow controller, the DUT being in fluid connection with chamber 14. The chamber has a known, fixed volume V and gas inlet and exit ports 16, 18, respectively. The ports 16, 18 can be selectively opened and closed to gas flow by valve elements 20, 22, respectively, the valve elements being controlled by system controller 28.

A pressure transducer 30 is in fluid communication with chamber 14. The transducer 30 provides a voltage output ($V_1$) representative of and preferably proportional to the gas pressure measured by the transducer. A signal modifying device 32 is connected to the electrical output of the pressure transducer 30, and includes temperature sensing means, in thermal contact with the gas in chamber 14, for providing a signal representative of the sensed temperature of the gas in chamber 14, as discussed in greater detail below, and is in the preferred form of a temperature-sensitive resistance element 38 ($R_{TC}$). As shown in FIG. 1, assuming the gas in the chamber is ideal, or substantially ideal, the combination of the pressure transducer 30 and the signal modifying device 32 is a combined transducer assembly 31 which provides a signal which is directly representative of n, or PV/RT.

The pressure transducer 30 can be, for example, any relatively high-accuracy pressure gauge. A preferred pressure sensing device is a capacitance manometer of the type which employs a movable metal diaphragm, responsive to the gas pressure being measured, as one of two plates of an electrical capacitor, the other plate being fixed. Changes in pressure on opposite sides of the diaphragm cause the diaphragm to move relative to the fixed plate, thereby creating an electrical signal indicative of a change in the electrical capacitance of the plates, and thus indicative of a change in pressure. However, the movement of the diaphragm in response to changes in pressure is relatively small and therefore does not significantly affect the volume of the chamber 14. A preferred capacitance manometer measures pressures in the range of, for example, 10 to 1000 torr. Other pressure measurement ranges, such as 1 to 100 torr, or 0.1 to 10 torr, can be obtained, if desired, by using a capacitance manometer of a different range. Obviously, other types of pressure measuring devices can be used, such as, for example, manometers using resistive bridges.

The preferred signal modifying device 32 comprises a voltage dividing network 35, various embodiments of which are illustrated in FIGS. 2A–2D. The voltage dividing network 35 includes an input terminal 34, a connection to ground 36, and at least one temperature-sensitive resistance element 38 ($R_{TC}$) electrically connected in series with at least one temperature-insensitive, or fixed, resistance element 40 ($R_F$) between the input terminal 34 and ground 36. An output terminal 42 is located between the resistance elements 38, 40.

The temperature of the gas inside the chamber 14 is measured inferentially with temperature-sensitive resistance element 38, which can be a temperature-sensitive resistor, integrated circuit component, thermistor or other temperature-responsive device known in the art. The temperature-sensitive resistance element 38 is mounted to be in thermal communication with the gas in chamber 14. This can be accomplished, for example, by mounting the temperature-sensitive resistance element 38 directly on the pressure sensing portion of the pressure transducer 30 so that the resistance element 38 is in thermal contact with the gas in the pressure sensor. The connection between the resistance element 38 and the pressure transducer 30 can be made, for example, using a thermally conductive epoxy or other bonding material. Alternatively, the resistance element 38 can be disposed, for example, in chamber 14, in an inlet or outlet port, in a finite length of line or tubing connected to the chamber, or at any location so long as the resistance element can reliably measure the temperature of the gas in chamber 14.

Figure 2A:
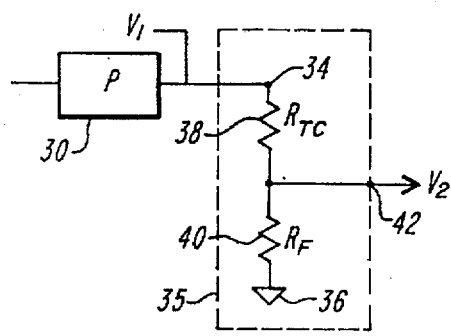
FIGS. 2A–2D are schematic illustrations of various embodiments of the signal modifying network employed in the apparatus of the present invention.

In FIG. 2A, the temperature-sensitive resistance element 38 is electrically connected between the input terminal 34 and the output terminal 42. The fixed resistance element 40 is electrically connected between the output terminal 42 and ground 36. This configuration is preferred when a temperature-sensitive resistance element having a positive temperature coefficient of resistance is used. The resistance of such resistance elements varies directly with the temperature and thus increases with increasing temperature and decreases with decreasing temperature. As the temperature of the gas in contact with the resistance element 38 increases, its resistance increases. The magnitude of the output voltage $V_2$ appearing across fixed sensitive resistance element 40 thus decreases, because a greater proportion of the total signal voltage is dropped across the temperature-sensitive resistance element 38.

Figure 2B:
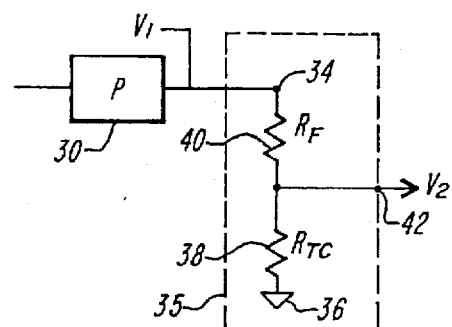

In FIG. 2B, the locations of the temperature-sensitive resistance element 38 and the fixed resistance element 40 are reversed from those of FIG. 2A. This configuration is preferred when a temperature-sensitive resistance element having a negative temperature coefficient of resistance is used. One such element is a thermistor. The resistance of such elements varies inversely with temperature and thus increases with decreasing temperature and decreases with increasing temperature. As the temperature of the gas in contact with the resistance element 38 increases, its resistance decreases. The magnitude of the output voltage $V_2$ appearing across resistance element 38 thus increases, because a smaller proportion of the total signal voltage is dropped across the resistance element 38.

Figure 2C:
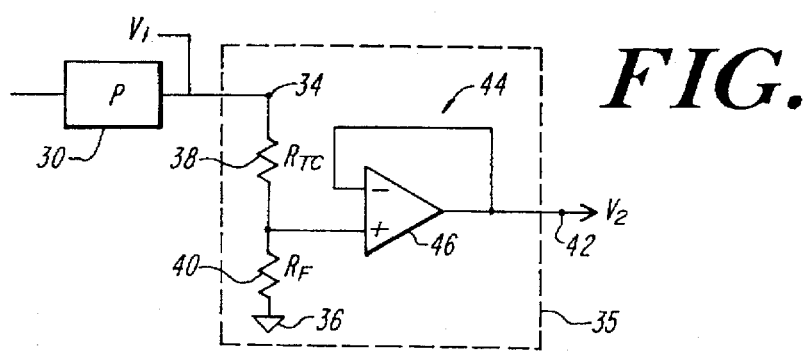

In FIG. 2C, the voltage dividing network 35 additionally includes an optional buffering circuit 44 for buffering the output signal $V_2$ in the event that current is drawn from the output signal by the device used to measure the output signal. The buffering circuit 44 includes an operational amplifier 46 having its non-inverting input connected to the output terminal 42 of the voltage dividing network, while the inverting input is connected to the output of the amplifier. The voltage across resistance element 40 of FIG. 2C (or across the resistance element 38 in the event the two elements are reversed) is applied to the noninverting input terminal of the operational amplifier 46 which in turn provides the output voltage $V_2$. The output signal $V_2$ is also applied to the inverting input terminal of the operational amplifier 46 so as to supply current as needed to maintain the output signal $V_2$ at an accurate value.

Figure 2D:
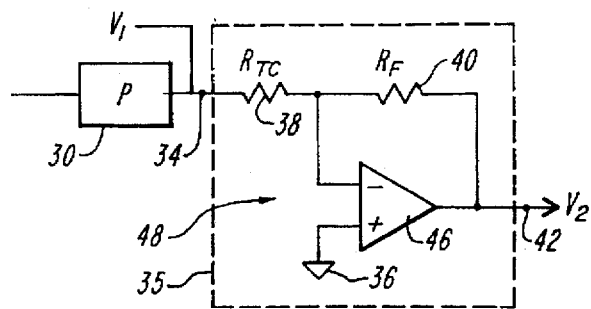

In FIG. 2D, the output voltage is buffered and inverted by an optional inverting network 48, which includes an operational amplifier 46 electrically connected in parallel with the fixed resistance element 40 so that the latter forms a feedback resistance between the inverting input and output of the terminals. The non-inverting input terminal of the amplifier is connected to ground 36. The output voltage $V_1$ from the pressure transducer 30 is applied across the resistance element 38 and the inverting input terminal of the operational amplifier 46. The inverting network 48 reverses the polarity of the output signal $V_2$ with respect to the polarity of the first (input signal $V_1$).

The temperature-sensitive resistance element 38 forms one portion of the voltage dividing network 35, and the fixed resistance element 40 forms a second portion of the network. As is well known in the art, the output signal from a voltage dividing network represents a fraction of the total voltage across both resistance elements. Variation of the variable resistance element (i.e., the temperature-sensitive resistance element 38) thus changes the magnitude of the output signal. The voltage dividing network 35 in the apparatus of the present invention receives an input signal $V_1$ in the range of approximately 0–12 volts DC and provides an output signal $V_2$ in the range of approximately 0–5 volts DC. This obviously can vary depending on voltage supplies, the pressure transducer and the resistance elements used.

In the apparatus of the present invention, the volume of the chamber 14 is known and therefore can be presumed to be constant regardless of the pressure and temperature measurements represented by the first signal $V_1$ from the pressure transducer 30 and the output signal $V_2$ from the signal modifying device 32. The chamber volume can be any desired value and can range, for example, from 0.03 liter to 0.1 liter or greater. To construct a chamber having a volume of 0.03 liter, for example, a four-inch length of a one-inch diameter tube with ¼-inch weld stubs at each end on center can be used. To construct a chamber having a volume of 0.10 liter, for example, a four-inch length of a 1.5-inch diameter tube can be used. Other desired chamber volumes can be similarly constructed using the appropriate tube lengths and diameters.

According to the ideal gas law identified above as equation (1), the number of moles of a gas, n, is proportional to the ratio PV/T. It is known that the partial derivative of n with respect to T ($\neq n/\neq T$) varies inversely with the square of T. Thus, in order to model the behavior of the gas in the chamber as a function of changing temperature of the gas, assuming a constant volume V and constant pressure P, the signal modifying device 32 provides an output signal that varies with changing temperature of the gas in chamber 14 in the same way as n varies. The output signal thus directly represents the number of moles of gas in the chamber.

Referring again to FIGS. 2A–2D, the voltage $V_1$ varies as a function of the measured pressure (P) so that the voltage $V_1$ can be considered to represent the product of PV since V, the volume of chamber 14, remains constant regardless of the pressure and temperature of the gas. The voltage $V_1$ is modified as a function of the resistance value of temperature-sensitive resistance element 38 which, as previously described, is a function of the temperature of the gas, so that the output voltage $V_2$ accounts for the temperature, volume and pressure of the gas in the chamber. The output voltage $V_2$ is thus directly representative of the number of moles n of the gas in the chamber.

In the signal modifying device of the present invention, the resistance of the fixed resistance element 40 ($R_F$) is defined in terms of the resistance of the temperature-sensitive resistance element 38 ($R_{TCref}$) at an absolute reference temperature $T_{ref}$.

The temperature-sensitive resistance element 38 has a resistance value $R_{TC}$ at a given absolute temperature T which is defined by the equation $$R_{TC}=R_{TCref}(1+\alpha(T-T_{ref})), \quad (2)$$

in which $R_{TCref}$ is the resistance of the temperature-sensitive resistance element 38 at a reference temperature $T_{ref}$ (in K), and $\alpha$ is the temperature coefficient of resistance of the temperature-sensitive resistance element 38 (in parts per million per K, or ppm/K), and T is the absolute temperature of the gas in the chamber (in K) , as inferred from the change in resistance of the temperature-sensitive resistance element.

To provide an output signal $V_2$ which properly accounts for the temperature of the gas in the chamber, the fixed resistance element 40 has a resistance value $R_F$ which is defined by the equation:

$$R_F=R_{TCref}(1-\alpha T_{ref}). \quad (3)$$

In a preferred embodiment, the temperature-sensitive resistance element 38 has a temperature coefficient of resistance of approximately 6000 ppm/K and a resistance of approximately 5000 ohms at an absolute reference temperature of 293K. The value of the fixed resistance element $R_F$ can be determined from equation (3) above to be approximately 3800 ohms.

The output signal $V_2$ from the transducer assembly 31 can be measured at any point in time to provide direct information about the quantity of gas in the chamber since the signal is almost an instantaneous response to changes in pressure and voltage, subject to the response time of the components of the transducer assembly, such as the response of the transducer and temperature-sensitive resistance element to respective changes in pressure and temperature, and the slew rate of the amplifier 46, if used. Additionally, the output signal $V_2$ can be measured at multiple points in time to provide information about average gas flow during an interval of time. For example, at an initial time $t_0$, the output signal $V_{2(0)}$ is representative of the temperature and pressure conditions $T_0$, $P_0$ of the gas in the volume-calibrated chamber at time $t_0$. At a later time $t_0$, the output signal $V_{2(1)}$ is representative of the temperature and pressure conditions $T_1$, $P_1$ of the gas in the volume-calibrated chamber at time $t_1$. Such measurements can be used to compute the average flow of the gas (e.g., in moles per second, standard cubic centimeters per minute, or other convenient units of standard volume of gas per unit of time) during the time interval $t_1-t_0$.

It should be noted that a determination of the volumetric flow of a substantially ideal gas through a DUT does not depend on the gas type: one mole of a substantially ideal gas is equal to 22.4 standard liters of the gas, regardless of the gas type. However, a determination of the mass (in grams) of a substantially ideal gas flowing through a DUT is a function of the particular gas being measured. Thus, if it is desired to express the gas flow through the DUT, as indicated directly by the output signal $V_2$, in terms of its mass instead of a standard unit of gas volume, a conversion factor based on the particular gas being measured is needed.

Figure 3A:
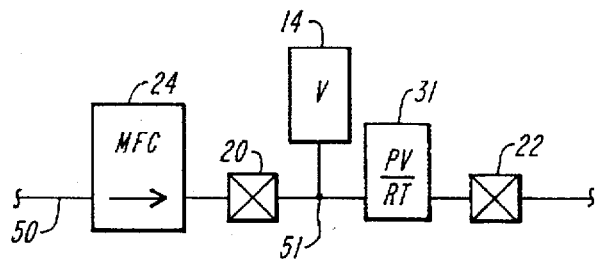
FIGS. 3A–3C are simplified block diagrams of various configurations of the apparatus of the present invention in a gas delivery system.
Figure 3B:
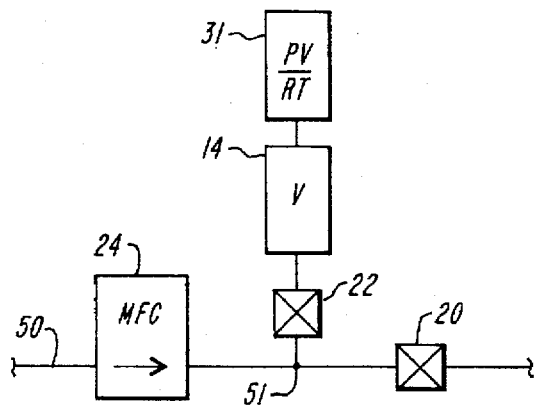
Figure 3C:
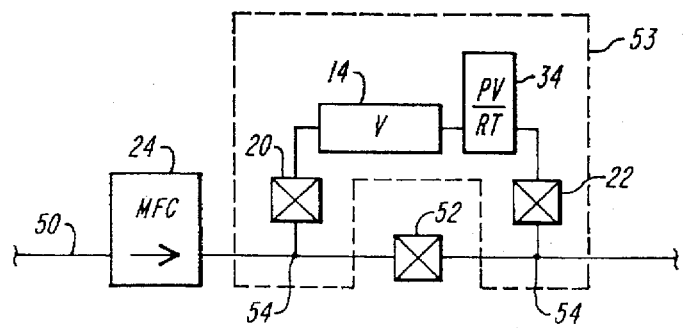
Figure 4A:
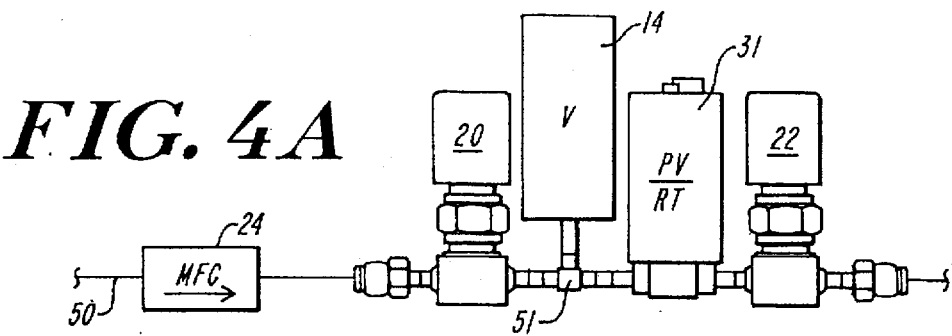
FIGS. 4A–4C are side elevational views of the mechanical configurations which correspond to the configurations illustrated schematically in FIGS. 3A–3C.
Figure 4B:
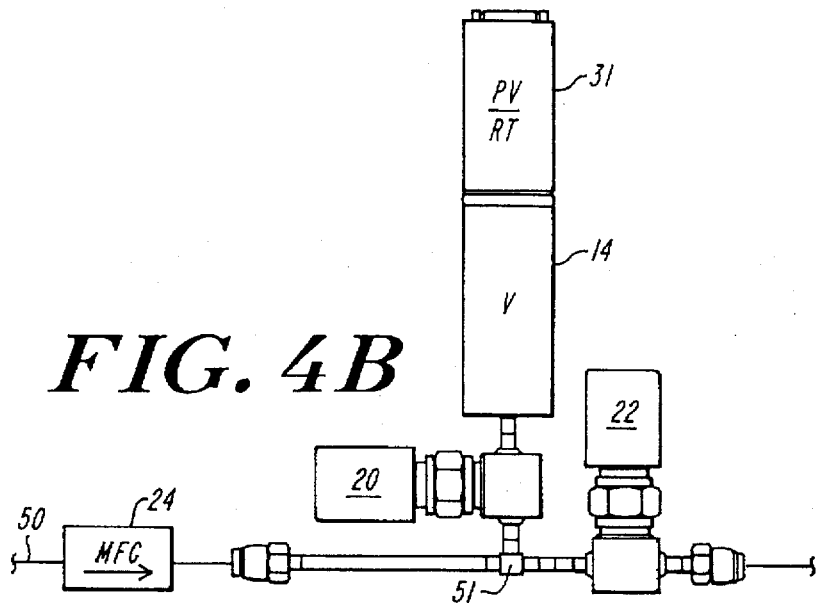
Figure 4C:
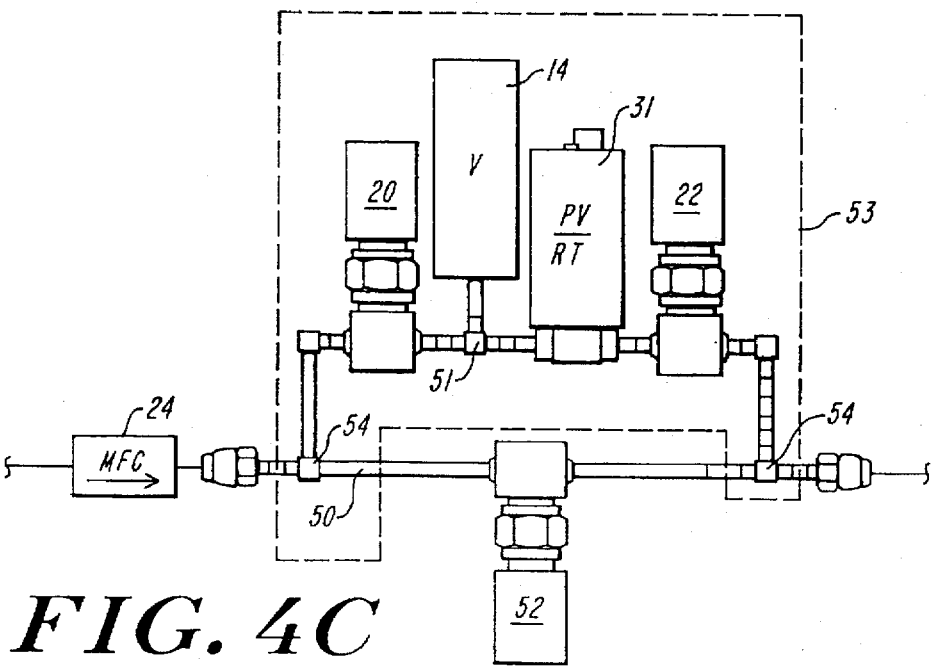

FIGS. 3A–3C illustrate schematically various configurations of the apparatus of the present invention as used to measure gas flow in and calibrate a gas delivery system. FIGS. 4A–4C illustrate the mechanical configurations which correspond to those shown in FIGS. 3A–3C.

In FIGS. 3A and 4A, a "downstream in-line" configuration is shown. A gas flow is conducted through a gas flow line 50 into a volume-calibrated chamber 14 (V) downstream from a DUT 24, illustrated as a mass flow controller. The chamber 14 can be a direct extension of the gas flow line 50, or connected to the gas flow line with a tee 51. A transducer assembly 31 is connected to the gas flow line 50 downstream from the chamber 14, and shutoff valves 20 and 22 are located in the gas flow line respectively upstream and downstream from the transducer assembly 31 so as to maintain the volume V constant. FIG. 4A illustrates the mechanical analog of this design.

In FIGS. 3B and 4B, a "downstream appendage" configuration is shown. A gas flow is conducted into a volume-calibrated chamber 14 downstream from the DUT 24, illustrated as a mass flow controller. The chamber 14 can be connected to the main gas flow line with a tee 51 and a shutoff valve 20 which can be closed for each measurement so as to insure a constant volume V. A transducer assembly 31 is in fluid connection with the chamber 14 but is not in the gas flow line. A shutoff valve 22 is located downstream from the chamber 14. FIG. 4B illustrates the mechanical analog of this design. This configuration has a shorter footprint than the in-line configuration of FIG. 4A and thus may be preferred in retrofit applications as being easier and more economical to implement. However, purging of the chamber 14 and the transducer assembly 31 is not as easy or effective as in the in-line design, and thus contamination of the gas may occur.

In FIGS. 3C and 4C, a "downstream bypass" configuration is shown. A gas flow is conducted through an upstream DUT 24, illustrated as a mass flow controller, into a bypass ell 54 which leads to a bypass circuit 53 controlled by upstream and downstream shutoff valves 20, 22 which can be closed for each measurement so as to insure a constant volume V. A volume-calibrated chamber 14 and a transducer assembly 31 are in the bypass circuit 53 between the shutoff valves. A third shutoff valve 52 is located in the main gas flow line and operates in tandem with the shutoff valves 20, 22 in the bypass circuit to direct the gas flow either around or through the bypass circuit. This configuration requires additional valving and plumbing controls but offers the advantage of relatively efficient purging of the chamber 14 and transducer assembly 31, as well as the convenience of a bypass design, which permits the calibration apparatus to be installed in retrofit applications and switched into and out of the gas flow line as needed.

In all of the embodiments described in FIGS. 3A–3C and 4A–4C, the volume V is represented by the volume in the chamber and the additional volume space between the shutoff valves 20 and 22 (in the case of FIGS. 3A and 3C and FIGS. 4A and 4C) and the additional volume space between the transducer assembly 31 and valve 22 in FIG. 3B and 4B. However, the volume in each configuration remains constant with each measurement.

The apparatus and method of the present invention provide an efficient, economical and direct means of measuring the amount of mass of a gas in a chamber of known, constant volume, assuming a substantially ideal gas is measured. The temperature-sensitive resistance element in the voltage dividing network which is associated with the pressure transducer provides a single output signal which is proportional to the ratio of pressure and volume to temperature of the gas in the chamber. The output signal is thus directly representative of the number of moles of gas in the chamber. The apparatus can be used, for example, in situ in fluid delivery systems, or in off-line test systems, to calibrate a mass flow meter or other device under test.

Because certain changes may be made in the above apparatus without departing from the scope of the invention herein disclosed, it is intended that all matter contained in the above description or shown in the accompanying drawings shall be interpreted in an illustrative and not a limiting sense.

What is claimed is:

1. A transducer assembly for use with means for defining a fixed volume of space for containing a gas whose mass is to be measured, said transducer assembly comprising:
   (a) means for generating a first signal as a function of the pressure of said gas within said fixed volume of space, and
   (b) means for generating an output signal, in response to the first signal and as a function of the temperature of said gas within said fixed volume of space, representative of the mass of said gas in said fixed volume, wherein said means for generating an output signal comprises a voltage dividing network including (a) an input terminal for receiving said first signal, (b) an output terminal for providing said output signal,
   (c) at least one temperature-sensitive resistance element having a resistance value dependent on the temperature of the gas in said fixed volume, (d) at least one temperature-insensitive resistance element, coupled in series with said temperature-sensitive resistance element, having a resistance value substantially independent of the temperature of the gas in said fixed volume,
   wherein one of said resistance elements is connected between said input and output terminals so that said output terminal is disposed between said temperature-sensitive resistance element and said temperature-insensitive resistance element, and said means for generating said output signal includes means for measuring the signal level at said output terminal.

2. An apparatus according to claim 1, wherein said means for generating said first signal includes means for generating said first signal so that said first signal is substantially proportional to said pressure of said gas within said fixed volume of space.

3. Apparatus according to claim 1, wherein said temperature-sensitive resistance element is electrically connected between said input terminal and said output terminal.

4. Apparatus according to claim 1, wherein said temperature-sensitive resistance element is electrically connected between said output terminal and ground.

5. Apparatus according to claim 4, wherein said temperature-sensitive resistance element is a thermistor.

6. Apparatus according to claim 1, wherein said voltage dividing network further includes means, coupled to said output terminal, for buffering said output signal.

7. Apparatus according to claim 6, wherein said buffering means comprises at least one operational amplifier electrically connected to said output terminal.

8. Apparatus according to claim 1, wherein said temperature-insensitive resistance element has a resistance value $R_F$ equal to $-R_{TCref}(1-\alpha T_{ref})$, wherein said temperature-sensitive resistance element has a resistance value $R_{TC}$ equal to $R_{TCref}(1+\alpha(T-T_{ref}))$, wherein $R_{TCref}$ is the resistance of said temperature-sensitive resistance element at an absolute reference temperature $T_{ref}$ in Kelvin, $\alpha$ is the temperature coefficient of resistance of said temperature-sensitive resistance element in ppm/K, and T is the absolute temperature in Kelvin of said gas in said fixed volume of space.

9. Apparatus according to claim 1, wherein the magnitude of said output signal is proportional to the ratio of the product of the pressure and volume of said gas in said chamber to the temperature of said gas in said chamber, and wherein said output signal is expressed in standard mass units of said gas per unit of signal energy.

10. Apparatus according to claim 9, wherein said output signal is expressed in moles of said gas per volt.

11. Apparatus according to claim 1, wherein said pressure transducing means comprises a capacitance manometer.

12. An apparatus for measuring the mass flow of a gas, said apparatus comprising:
   A. means for defining a fixed volume of space for containing a gas whose mass is to be measured;
   B. means for connecting said apparatus to a source of said gas so that gas can be introduced into said fixed volume of space; and
   C. a transducer assembly in fluid and thermal communication with the fixed volume of space, said assembly including (a) means for generating a first signal as a function of the pressure of said gas within said fixed volume of space, and (b) means for generating an output signal, in response to the first signal and as a function of the temperature of said gas within said fixed volume of space, representative of the mass of said gas in said fixed volume, wherein said means for generating an output signal comprises a voltage dividing network including (a) an input terminal for receiving said first signal, (b) an output terminal for providing said output signal, (c) at least one temperature-sensitive resistance element having a resistance value dependent on the temperature of the gas in said fixed volume, (d) at least one temperature-insensitive resistance element, coupled in series with said temperature-sensitive resistance element, having a resistance value substantially independent of the temperature of the gas in said fixed volume,
   wherein one of said resistance elements is connected between said input and output terminals so that said output terminal is disposed between said temperature-sensitive resistance element and said temperature-insensitive resistance element, and said means for generating said output signal includes means for measuring the signal level at said output terminal.

13. An apparatus according to claim 12, wherein said means for defining a fixed volume of space comprises a chamber, an inlet to said chamber and an outlet to said chamber, and valve means for selectively opening and closing said inlet and outlet to said chamber.

14. An apparatus according to claim 12, wherein said means for generating said first signal includes means for generating said first signal so that said first signal is substantially proportional to said pressure of said gas within said fixed volume of space.

15. Apparatus according to claim 12, wherein said temperature-sensitive resistance element is electrically connected between said input terminal and said output terminal.

16. Apparatus according to claim 12, wherein said temperature-sensitive resistance element is electrically connected between said output terminal and ground.

17. Apparatus according to claim 16, wherein said temperature-sensitive resistance element is a thermistor.

18. Apparatus according to claim 12, wherein said voltage dividing network further includes means, coupled to said output terminal, for buffering the said output signal.

19. Apparatus according to claim 18, wherein said buffering means comprises at least one operational amplifier electrically connected to said output terminal.

20. Apparatus according to claim 12; wherein said temperature-insensitive resistance element has a resistance value $R_F$ equal to $-R_{TCref}(1-\alpha T_{ref})$, wherein said temperature-sensitive resistance element has a resistance value $R_{TC}$ equal to $R_{TCref}(1+\alpha(T-T_{ref}))$, wherein $R_{TCref}$ is the resistance of said temperature-sensitive resistance element at an absolute reference temperature $T_{ref}$ in Kelvin, $\alpha$ is the temperature coefficient of resistance of said temperature-sensitive resistance element in ppm/K, and T is the absolute temperature in Kelvin of said gas in said chamber.

21. Apparatus according to claim 12, wherein the magnitude of said output signal is proportional to the ratio of the product of the pressure and volume of said gas in said chamber to the temperature of said gas in said chamber, and wherein said output signal is expressed in standard mass units of said gas per unit of signal energy.

22. Apparatus according to claim 21, wherein said output signal is expressed in moles of said gas per volt.

23. Apparatus according to claim 12, wherein said pressure transducing means comprises a capacitance manometer.

24. Apparatus according to claim 12, further including means for controlling the flow of gas into said fixed volume of space.

25. Apparatus according to claim 24, wherein said means for controlling the flow of gas includes a mass flow controller.

26. Apparatus for measuring the flow of a gas, said apparatus comprising:
  A. a source of a gas;
  B. a chamber in fluid connection with said source and having a gas inlet port, a gas outlet port and valve means for selectively opening and closing said ports to a flow of said gas, said chamber having a known constant volume;
  C. flow controlling means for conducting a controlled flow of said gas from said source into said chamber; and
  D. a transducer assembly comprising, in combination,
    i. pressure transducing means for measuring the pressure of said gas in said chamber and for providing a first signal representative of and proportional to said pressure, and
    ii. means, associated with said pressure transducing means, for modifying said first signal to obtain an output signal representative of the mass of said gas in said chamber,
wherein said signal modifying means comprises a voltage dividing network having an input terminal, at least one temperature-sensitive resistance element and at least one temperature-insensitive resistance element electrically connected in series between said input terminal and ground, and an output terminal between said temperature-sensitive resistance element and said temperature-insensitive resistance element.

27. Apparatus according to claim 26, wherein said temperature-sensitive resistance element is electrically connected between said input terminal and said output terminal.

28. Apparatus according to claim 26, wherein said temperature-sensitive resistance element is electrically connected between said output terminal and ground.

29. Apparatus according to claim 28, wherein said temperature-sensitive resistance element is a thermistor.

30. Apparatus according to claim 26, wherein said temperature-sensitive resistance element is in thermal connection with said gas in said chamber.

31. Apparatus according to claim 26, wherein said voltage dividing network further includes means for buffering said output signal.

32. Apparatus according to claim 31, wherein said buffering means comprises at least one operational amplifier electrically connected to said output terminal.

33. Apparatus according to claim 26, wherein said temperature-insensitive resistance element has a resistance value $R_F$ equal to $-R_{TCref}(1-\alpha T_{ref})$, wherein said temperature-sensitive resistance element has a resistance value $R_{TC}$ equal to $R_{TCref}(1+\alpha(T-T_{ref}))$, wherein $R_{TCref}$ is the resistance of said temperature-sensitive resistance element at an absolute reference temperature $T_{ref}$ in Kelvin, $\alpha$ is the temperature coefficient of resistance of said temperature-sensitive resistance element in ppm/K, and T is the absolute temperature in Kelvin of said gas in said chamber.

34. Apparatus according to claim 26, wherein the magnitude of said output signal is proportional to the ratio of the pressure and volume of said gas in said chamber to the temperature of said gas in said chamber, and wherein said output signal is expressed in standard mass units of said gas per unit of signal energy.

35. Apparatus according to claim 34, wherein said output signal is expressed in moles of said gas per volt.

36. Apparatus according to claim 26, wherein said pressure transducing means comprises a capacitance manometer.

37. A method of measuring the mass flow of a gas, said method comprising:
  A. introducing the gas whose mass is to be measured into a fixed volume of space for containing the gas; and
  B. generating a first signal as a function of the pressure of said gas within said fixed volume of space, and generating an output signal, in response to the first signal and as a function of the temperature of said gas within said fixed volume of space, representative of the mass of said gas in said fixed volume,
wherein the step of generating said output signal includes the steps of:
  generating said first signal as a voltage across a voltage divider including at least one temperature-sensitive resistance element having a resistance value dependent on the temperature of the gas in said fixed volume, and at least one temperature-insensitive resistance element, coupled in series with said temperature sensitive resistance element, having a resistance value substantially independent of the temperature of the gas in said fixed volume, said divider being connected to ground, and
  measuring the output signal at a point between said resistance elements and ground.

38. A method according to claim 37, wherein said step of generating said first signal includes the step of generating said first signal so that said first signal is substantially proportional to the pressure of the gas within the fixed volume of space.

39. A method according to claim 37, wherein the step of measuring includes the step of measuring the voltage across said temperature-sensitive resistance element.

40. A method according to claim 37, wherein the step of measuring includes the step of measuring the voltage across said temperature-insensitive resistance element.

41. A method according to claim 37, further including the step of buffering said output signal.

42. A method according to claim 37, wherein the step of introducing the gas whose mass is to be measured into a fixed volume of space includes the step of controlling the flow of said gas into said fixed volume.

43. A method of calibrating a mass flow controller for use in controlling mass flow of a gas, said method comprising:

A. connecting said mass flow controller to a source of gas;

B. transmitting the gas whose mass is to be measured through said controller and into a fixed volume of space for containing the gas;

C. generating a first signal as a function of the pressure of said gas within said fixed volume of space, and generating an output signal, in response to the first signal and as a function of the temperature of said gas within said fixed volume of space, representative of the mass of said gas in said fixed volume; and D. comparing the value of mass represented by said output signal with the corresponding measurement of said mass flow controller, wherein the step of generating said output signal includes the steps of:

generating said first signal as a voltage across a voltage divider including at least one temperature-sensitive resistance element having a resistance value dependent on the temperature of the gas in said fixed volume, and at least one temperature-insensitive resistance element, coupled in series with said temperature sensitive resistance element, having a resistance value substantially independent of the temperature of the gas in said fixed volume, said divider being connected to ground, and measuring the output signal at a point between said resistance elements and ground.

44. A method according to claim 43, wherein said step of generating said first signal includes the step of generating said first signal so that said first signal is substantially proportional to the pressure of the gas within the fixed volume of space.

45. A method according to claim 43, wherein the step of measuring includes the step of measuring the voltage across said temperature-sensitive resistance element.

46. A method according to claim 43, wherein the step of measuring includes the step of measuring the voltage across said temperatureinsensitive resistance element.

47. A method according to claim 43, further including the step of buffering said output signal.

48. A method according to claim 43, wherein the step of introducing the gas whose mass is to be measured into a fixed volume of space includes the step of controlling the flow of said gas into said fixed volume.

* * * * *